Patented Sept. 25, 1951

2,568,989

UNITED STATES PATENT OFFICE 2,568,989

STABILIZED VINYL CHLORIDE POLYMER COMPOSITIONS

Elmer E. Cowell, St. Louis County, and Joseph R. Darby, Richmond Heights, Mo., assignors to Monsanto Chemical Company, St. Louis, Mo., a corporation of Delaware No Drawing. Application April 27, 1949, Serial No. 90,054

11 Claims. (Cl. 260—45.85)

This invention relates to the art of stabilizing vinyl chloride-containing resins.

The stabilization of vinyl chloride-containing resins has presented a serious problem, for example in preventing discoloration on exposure to light. Many types of stabilizing materials have been suggested for imparting light stability but relatively few are especially effective. However, it is very important to provide effective stabilizers since plastic compositions containing vinyl chloride polymers are frequently employed for uses involving exposure to sunlight.

It is an object of this invention to provide vinyl chloride-containing resins having improved resistance to deterioration.

A further object of this invention is to provide vinyl chloride-containing resin compositions having increased light resistance.

According to the present invention, compositions comprising vinyl chloride-containing resins, mono alkyl diaryl phosphates in which the alkyl group contains 6-14 carbon atoms and the aryl groups are phenyl or cresyl groups, and tetrahydro furfuryl esters of unsaturated fatty acids containing 10-20 carbon atoms are unusually resistant to discoloration on exposure to light.

The following examples are illustrative of the invention but are not to be considered as limitative thereof. Where parts are mentioned, they are parts by weight.

Example I

A mixture of 60 parts polyvinyl chloride, 37 parts 2-ethylhexyl diphenyl phosphate and 3 parts tetra-hydrofurfuryl 9-octadecenoate is milled on rolls maintained at a temperature of 325° F. for 5 minutes to form a homogeneous composition. The resulting composition is pressed into the form of a sheet in a suitable mold under a pressure of 4,000 pounds per sq. in. and at a temperature of 325° F. for two minutes. The resulting sheet is found to be transparent and free from discoloration. A portion of the sheet is tested for light stability by placing it in a National X-1-A weatherometer. After exposure under these conditions for 100 hours, it is found that the sheet is substantially unchanged in color.

In contrast to the above example, an otherwise identical sheet in which 40 parts of 2 ethylhexyl diphenyl phosphate are used in place of the mixture of 2-ethylhexyl diphenyl phosphate and tetrahydro furfuryl 9-octadecenoate used in Example 1, is found to become brown when exposed under the same conditions.

Example II

Example I is repeated except that the amount of 2-ethylhexyl diphenyl phosphate is reduced to 30 parts and the amount of tetra-hydro furfuryl 9-octadecenoate is increased to 10 parts. Sheets from this composition prepared as in Example I are found to be substantially unchanged in color after exposure in the National X-1-A weatherometer for 150 hours.

Example III

Example I is repeated except that the plasticizer is made up of 18 parts 2-ethylhexyl diphenyl phosphate, 18 parts of tri-2-ethylhexyl phosphate and 4 parts tetra-hydro furfuryl 9-octadecenoate. A substantial improvement in stability on exposure to light is noted as compared with an otherwise identical composition in which the tetra-hydro furfuryl 9-octadecenoate is omitted.

Example IV

Example I is repeated except that the polyvinyl chloride is replaced by a copolymer of 90 parts vinyl chloride and 10 parts vinyl acetate. The resulting composition is found to have unexpectedly increased light resistance as compared with the compositions in which the tetra-hydro furfuryl 9-octadecenoate is omitted or replaced by an equal amount of the 2-ethylhexyl diphenyl phosphate.

Example V

Example I is repeated except that the polyvinyl chloride is replaced by a copolymer of 90 parts vinyl chloride and 10 parts vinylidene chloride. The inclusion of the tetra-hydro furfuryl 9-octadecenoate is found to result in a marked improvement in the light stability.

Example VI

Example I is repeated except that the polyvinyl chloride is replaced by a copolymer of 90 parts vinyl chloride and 10 parts diethyl maleate. It is found that the inclusion of the tetra-hydro furfuryl 9-octadecenoate is also effective in improving the light stability of this copolymer.

Consideration of the results set forth in the above examples clearly indicates the effectiveness of tetra-hydro furfuryl 9-octadecenoate in improving the light stability of vinyl chloride-containing resins plasticized with 2-ethylhexyl diphenyl phosphate. According to the present invention, tetra-hydro furfuryl esters of other unsaturated fatty acids containing 10-20 carbon atoms may be substituted for the tetra-hydro furfuryl 9-octadecenoate to impart light stability to such compositions. Examples of tetra-hydro furfuryl esters which may be employed in accordance with the invention include tetra-hydro furfuryl esters of mono-olefinic unsaturated aliphatic acids, such as 7-hexadecenoic acid, 10-undecenoic acid, 13-docosenoic acid and 9-octadecenoic acid; diolefinic-unsaturated aliphatic acids such as 9,12-octadecadienoic acid; triolefinic-unsaturated aliphatic acids such as 9,12,15-octadecatrienoic acid, 9,11,13-octadecatrienoic acid; substituted olefinic acids, for example, such hydroxy olefinic acids as 16-hydroxy-7-hecadecenoic acid, 12-hydroxy-9-octadecenoic acid, etc.

Mixtures of tetra-hydro furfuryl esters of unsaturated fatty acids containing 10-20 carbon atoms may be employed when desired.

The amount of the stabilizing tetra-hydro furfuryl ester which is employed according to the invention may be substantially varied. For example, as little as 1 part for every 100 parts of vinyl chloride-containing resin has a noticeable effect in increasing the light stability of the compositions. As indicated by the examples, much larger amounts may be used although it is usually not desirable to employ more than 25 parts for every 100 parts of vinyl chloride-containing resin.

The tetra-hydro furfuryl esters of the invention are effective in stabilizing vinyl chloride-containing resins plasticized with alkyl diaryl phosphates generally in which the alkyl group contains 6-14 carbon atoms and the aryl groups are phenyl or cresyl groups, i. e., ortho, meta or para-cresyl groups. Examples of such esters include 2-ethylhexyl diphenyl phosphate, 2-ethylhexyl dicresyl phosphate, 2-ethylhexyl phenylcresyl phosphate, hexyl diphenyl phosphate, hexyl phenyl cresyl phosphate, hexyl dicresyl phosphate, dodecyl diphenyl phosphate, dodecyl phenyl cresyl phosphate, dodecyl dicresyl phosphate, etc. Mixtures of such esters may frequently be used advantageously. The amount of the phosphate ester which is used may be substantially varied depending upon the particular ester and upon the particular use which is contemplated for the plasticized composition. Usually however from 25 to 100 parts of the ester are used for every 100 parts of vinyl chloride-containing resin.

When desired, mixtures of the phosphate esters of the invention and other plasticizers may be used as, for example, such conventional plasticizers as di-octyl phthalate, tri-cresyl phosphate, etc.

In addition to the stabilizing tetra-hydro furfuryl esters of the invention, other light and/or heat stabilizers may be included in the compositions, examples of which are well known to those skilled in the art.

It is also to be understood that other well known additives may be included such as pigments and other coloring materials, resin modifiers and the like.

As indicated by the examples, copolymers of vinyl chloride and other unsaturated materials copolymerizable therewith may be stabilized in accordance with the invention. For example, copolymers of vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, ortho-chloro-styrene, para-chlorostyrene, 2,5-dichlorostyrene, 2,4-dichlorostyrene, para-ethyl styrene, divinyl benzene, vinyl naphthalene, alpha-methyl styrene; dienes, such as butadiene, chloroprene; amides, such as acrylic acid amide, acrylic acid anilide; nitriles, such as acrylic acid nitrile; esters of $\alpha,\beta$-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion, i. e., more than 50% by weight, of the copolymer is made from vinyl chloride, represents a preferred class of polymers to be treated according to the invention.

A particularly preferred embodiment of the invention comprises the stabilization of polymers prepared by copolymerizing vinyl chloride and an ester of an $\alpha,\beta$-unsaturated dicarboxylic acid such as diethyl maleate, in which 5-20 parts by weight of diethyl maleate are used for every 95-80 parts by weight of vinyl chloride. Among the preferred esters of $\alpha,\beta$-unsaturated dicarboxylic acids are the alkyl esters in which the alkyl group contains 1-8 carbon atoms.

It is obvious that many variations may be made in the products and processes of this invention without departing from the spirit and scope thereof as defined in the appended claims.

We claim:

1. A composition comprising a vinyl chloride polymer, a mono alkyl diaryl phosphate in which the alkyl group contains 6-14 carbon atoms and the aryl groups are from the group consisting of phenyl and cresyl groups and, as a light stabilizer therefor, a tetra hydro furfuryl ester of an unsaturated fatty acid containing 10-20 carbon atoms.

2. A composition comprising a vinyl chloride polymer, a monoalkyl diaryl phosphate in which the alkyl group contains 6-14 carbon atoms and the aryl groups are from the group consisting of phenyl and cresyl groups and, as a light stabilizer therefor, tetrahydro furfuryl 9-octadecenoate.

3. A composition comprising 100 parts by weight of polyvinyl chloride, 25-100 parts by weight of 2-ethylhexyldiphenyl phosphate and, as a light stabilizer therefor, 1-25 parts by weight of tetrahydro furfuryl 9-octadecenoate.

4. A composition comprising polyvinyl chloride, a mono alkyl diaryl phosphate in which the alkyl group contains 6-14 carbon atoms and the aryl groups are from the group consisting of phenyl and cresyl groups and, as a light stabilizer therefor, a tetra hydro furfuryl ester of an unsaturated fatty acid containing 10-20 carbon atoms.

5. A composition comprising a copolymer of vinyl chloride and vinyl acetate, a mono alkyl diaryl phosphate in which the alkyl group contains 6-14 carbon atoms and the aryl groups are from the group consisting of phenyl and cresyl groups and, as a light stabilizer therefor, a tetra hydro furfuryl ester of an unsaturated fatty acid containing 10-20 carbon atoms.

6. A composition comprising a copolymer of vinyl chloride and diethyl maleate, a mono alkyl diaryl phosphate in which the alkyl group contains 6-14 carbon atoms and the aryl groups are from the group consisting of phenyl and cresyl groups and, as a light stabilizer therefor, a tetra hydro furfuryl ester of an unsaturated fatty acid containing 10-20 carbon atoms.

7. A composition comprising a vinyl chloride polymer, 2-ethylhexyl diphenyl phosphate and, as a light stabilizer therefor, tetra hydro furfuryl 9-octadecenoate.

8. A composition comprising polyvinyl chloride, a monoalkyl diaryl phosphate in which the alkyl group contains 6-14 carbon atoms and the aryl groups are from the group consisting of phenyl and cresyl groups and, as a light stabilizer therefor, tetrahydro furfuryl 9-octadecenoate.

9. A composition comprising polyvinyl chloride, 2-ethylhexyl diphenyl phosphate and, as a light stabilizer therefor, tetrahydro furfuryl 9-octadecenoate.

10. A composition comprising a copolymer of vinyl chloride and vinyl acetate, a monoalkyl diaryl phosphate in which the alkyl group contains 6-14 carbon atoms and the aryl groups are from the group consisting of phenyl and cresyl groups and, as a light stabilizer therefor, tetrahydro furfuryl 9-octadecenoate.

11. A composition comprising a copolymer of vinyl chloride and diethyl maleate, a monoalkyl diaryl phosphate in which the alkyl group contains 6-14 carbon atoms and the aryl groups are from the group consisting of phenyl and cresyl groups and, as a light stabilizer therefor, tetrahydro furfuryl 9-octadecenoate.

ELMER E. COWELL.
JOSEPH R. DARBY.

REFERENCES CITED

The following references are of record in the file of this patent:

UNITED STATES PATENTS

| Number | Name | Date |
|---|---|---|
| 2,457,035 | Darby | Dec. 21, 1948 |

OTHER REFERENCES

Modern Plastics, vol. 24, December 1946, pages 163-166.